Sept. 20, 1960  E. B. CORNELIUS  2,952,888
METHOD FOR CLAY EXTRUSION
Filed July 15, 1955 2 Sheets-Sheet 1
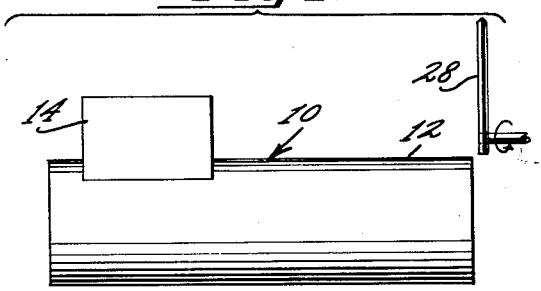
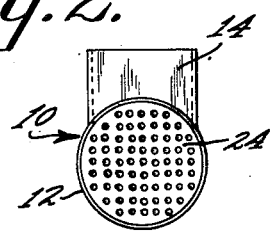
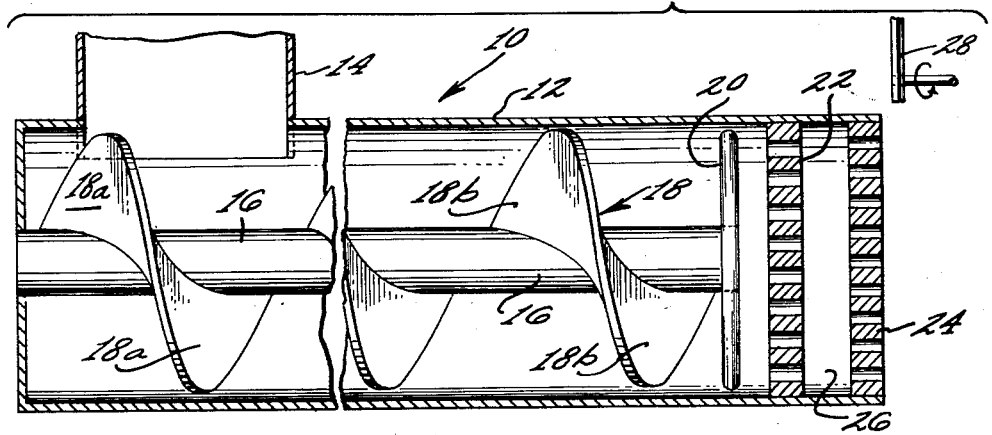
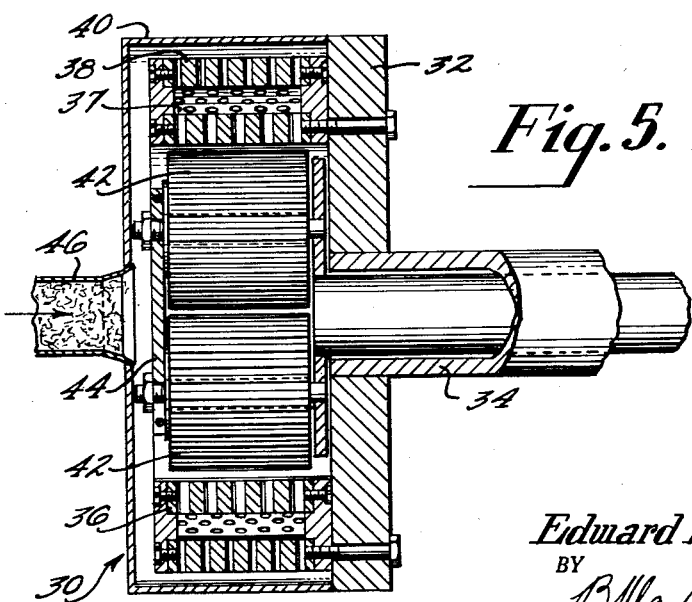
INVENTOR.
*Edward B. Cornelius*
BY
*ATTORNEY.*

Sept. 20, 1960    E. B. CORNELIUS    2,952,888
METHOD FOR CLAY EXTRUSION

Filed July 15, 1955    2 Sheets-Sheet 2

INVENTOR.
Edward B. Cornelius
BY
ATTORNEY.

United States Patent Office 2,952,888
Patented Sept. 20, 1960

2,952,888

METHOD FOR CLAY EXTRUSION

Edward B. Cornelius, Swarthmore, Pa., assignor to Houdry Process Corporation, Wilmington, Del., a corporation of Delaware Filed July 15, 1955, Ser. No. 522,403

5 Claims. (Cl. 25—156)

The present invention relates to a method for extruding fault-free kaolin clay pellets, and in particular, to a method for extruding kaolin clay pellets suitable for use as hydrocarbon conversion catalysts.

Recently, a variety of methods have been developed which produce excellent hydrocarbon conversion catalysts from kaolin clays, such as sulfation methods for converting relatively inactive kaolin type clays into active masses by contacting such clays with gases comprising sulphur trioxide at relatively high temperatures, such as between about 650 to 900° F. Such methods require clay pellets having excellent hardness properties or valuable hydrocarbon conversion catalysts cannot be obtained therefrom.

It has been determined that the method of extruding plasticized kaolin type clays plays an important role in the physical properties of the resultant extruded clay pellet. Thus, it has been found that when such clays are extruded through a single die plate with either a worm type or roll-ring type extruder the extruded pellet possesses poor hardness characteristics. These poor hardness characteristics are attributed to fault planes within the clay pellets.

The origin of these fault planes in the clay pellets is not clearly understood. However, it has been theorized in the case of worm-type extruders that the worm itself and the impeller on the end of the worm juxtaposed to the die plate which distributes the plasticized mass of clay that is to be extruded across the inner face of the die plate creates voids in the clay, which give rise to such faults. Other theories as to the origin of these faults stem from the plate-like structure of the clay, namely that the plate-like structure results in the formation of slip-planes while the clay is wet, and that the faults originate with these slip-planes.

In any event the failure to obtain clay pellets having satisfactory hardness characteristics has impeded the development of valuable hydrocarbon conversion catalysts from plastic kaolin.

This invention has as an object the provision of a method for extruding kaolin type clays and forming pellets therefrom which pellets are possessed of superior hardness characteristics and are relatively free from faults.

These and other objects are accomplished by the method of the present invention in which a plasticized clay mass, such as a plasticized mixture of kaolin clay and water is extruded through an extruder having a double die plate, with the die plates spaced from each other a distance at least twice the diameter of the openings in the inner plate. In accordance with the preferred embodiment of the present invention, the plasticized mixture of clay and water in the extruder should contain the minimum possible amount of water which serves to form a plasticized mixture; namely, for commercial extruders having a bore of 6 to 12 inches, a percent weight of water on a dry basis of between about 25 to 35 percent is to be preferred, with the optimum water content comprising about 28 to 33 percent.

The extrusion equipment of the present invention may comprise a worm or auger-type extruder, or a roll-ring type extruder, provided that such extruder includes a pair of die plates spaced from each other.

For the purpose of illustrating the invention there are shown in the drawings forms which are presently preferred; it being understood, however, that this invention is not limited to the precise arrangements and instrumentalities shown.

Referring to the accompanying drawings wherein like reference characters refer to like parts:

Figure 1 is an elevational view of the auger-type or worm type extruder embodiment of the present invention.

Figure 2 is an end elevational view of the exit die plate side of the extruder shown in Figure 1.

Figure 3 is a longitudinal section through an auger-type or worm type extruder of Figure 1.

Figure 5 is a cross-section through the roll-ring type extruder shown in Figure 4.

Figure 4:
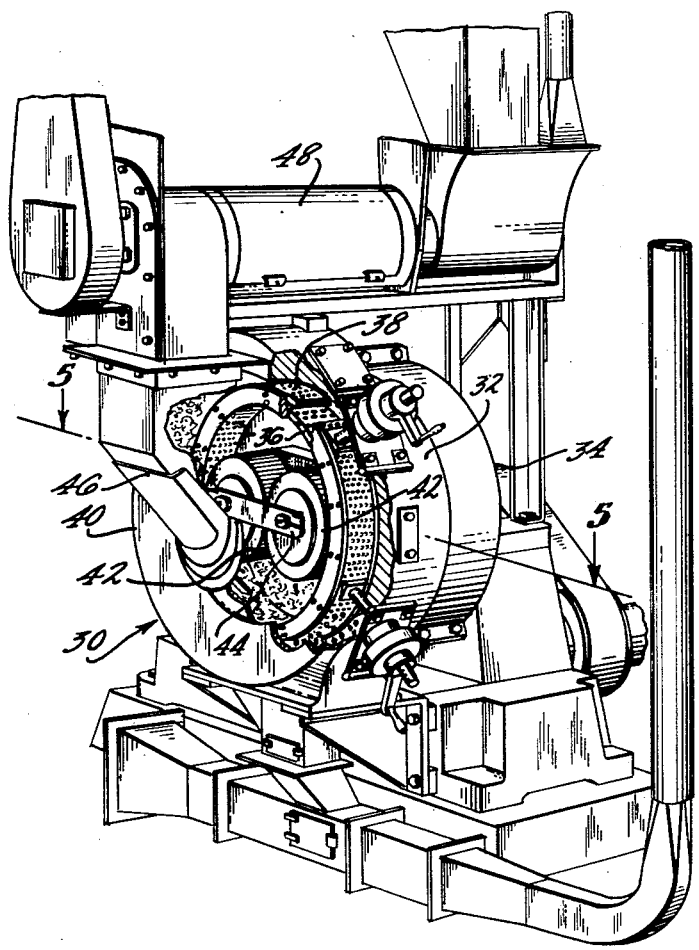
Figure 4 is an elevational view of a roll-ring type extruder of the present invention.

Referring to the drawings and initially to Figures 1, 2 and 3, the worm-type extruder of the present invention is designated 10 and includes a cylindrical tube 12 having an opening in the peripheral wall surface thereof proximate one end, said opening being provided with feed hopper 14 through which a plasticized mass of clay and water may be charged to the extruder 10.

The worm 16 of extruder 10 comprises a plurality of flights designated 18 with the flights 18a proximate the feed hopper 14 being spaced somewhat further apart, e.g. having a larger pitch, than the flights 18b proximate the discharge end of tube 12. In this manner positive feeding of material from the hopper 14 to the discharge end of tube 12 with desired kneading and homogenizing is assured. The free edge of the flights 18 is closely adjacent the inner wall surface of tube 12, with but a minimum clearance being provided between the inner wall surface of tube 12 and the free edge of the flights 18.

In commercial extruders of the auger-type shown in Figures 1 and 2 the diameter of the bore of the tube 12 is normally between about 6 and 12 inches, although smaller or larger diametered extruders are occasionally used.

The end of worm 16 is provided with an impeller 20, which is subsequent to the last flight 18b. The impeller 20 evenly distributes the plasticized mass of clay over the inner face of inner die plate 22, and prevents localization of plasticized clay masses on a portion of the die plate face.

An exit die plate 24 is retained in tube 12 an axially spaced distance from inner die plate 22, the intervening spacing comprising chamber 26 in which the extruded material from the inner die plate 22 is reformed, followed by its subsequent extrusion through exit die plate 24.

The openings in inner die plate 22 are preferably somewhat larger than the openings in exit die plate 24, although a larger number of openings may be provided in exit die plate 24. The area provided by such openings in the exit die plate 24, however, should not exceed the area provided by the openings in inner die plate 22, to any marked extent. Thus, to form clay into cylinders having a diameter of 4.3 mm., the openings in the exit die plate 24 may be of the order of about 4.75 mm. in diameter to allow for shrinkage. As a practical matter, the openings in exit die plate 24 should always be somewhat larger than the desired diametric thickness of the finished extruded pellets in order to allow for shrinkage losses.

Preferably, but not necessarily, the openings in the inner die plate 22 should be larger than the diameter of the openings in exit die plate 24. A preferred embodiment contemplates opening in the exit die plate 24 approximately half the diameter of the openings in inner die plate 22. Thus, with the aforesaid diametric dimensions of 4.75 mm. for the openings in the exit die plate 24, opening dimension in the inner die plate 22 would be of the order of about 9 mm., preferably about 9.5 mm. For most pellets used in commercial hydrocarbon conversion units a diameter of between about 1 to 8 mm. is desirable; preferably, a diameter of the order of about 3 to 6 mm. Commercial catalyst pellets are preferably in the form of cylinders having a length equal to, or greater than, their diameter. Knife 28 is spaced apart from the outer face of exit die plate 24 but with relatively close clearance, and its speed of rotation periodically sweeping across the outer face of die plate 24 is regulated with reference to the rate of emergence of the extruded cylindrical strands to cut such strands into cylinders having the desired predetermined length.

An extrusion pressure of between about 1000 to 3000 lbs. per square inch within extruder 10 may be used, with an extrusion pressure of about 2000 lbs. per square inch being suitable.

It has been found that the extent of axial spacing between die plates 22 and 24 plays an important role in determining the hardness of the resultant pellets. It has been further found that an increase in the axial distance between die plates 22 and 24, improves the hardness characteristics of the resultant pellets. However, as a practical matter, for extruders having a bore diameter of 2 to 12 inches, increasing the spacing between die plates 22 and 24 to a distance in excess of twenty times the diametric size of the openings in die plate 22 has but an insignificant beneficial effect. In fact, in many instances with extruders of the aforesaid bore diameter increasing the axial distance between die plates 22 and 24 to a distance greater than 1 inch will have relatively little beneficial effect upon the physical properties of the resultant extruded pellets.

Example 1

In a 2-inch worm extruder, a single die plate five-eighths of an inch thick and having eighty-five 4.75 mm. openings was utilized. The die plate was spaced one and three-sixteenths inches from the impeller.

The raw clay treated in this example was a kaolin clay from Putnam County, Florida, known as "Edgar Plastic Kaolin" which has the following typical analysis on a dry (105° C.) sand-free basis:

| | Percent |
|---|---|
| Ignition loss | 12.9 |
| $SiO_2$ | 46.6 |
| $Al_2O_3$ | 38.8 |
| $Fe_2O_3$ | 1.0 |
| CaO | 0.44 |
| MgO | 0.23 |
| $TiO_2$ | 0.35 |
| Alk. metal (as oxide) | 0.52 |

A mixture of this clay and water (33.3 water percent weight on a 220° F. dry basis) was extruded through this extruder and yielded clay pellets having a bulk density of 0.96 kilogram per liter, which pellets had a knife edge hardness of 8300 grams, a four-ball hardness index of 63 and an air jet attrition percent loss of 95.

Example 2

A kaolin clay mixture similar to that used in Example 1 was extruded in a 2 inch worm extruder of the present invention having two die plates, the inner plate being spaced thirteen-sixteenths inch from the impeller. This plate had a thickness of ⅞ of an inch and was provided with 9.5 mm. openings. The exit die plate was spaced from the inner die plate a distance of ¾", the exit die plate having a thickness of ¾" and being provided with 4.75 mm. openings. The clay pellets obtained under these conditions had a bulk density of 0.98 kilogram per liter, a knife edge hardness of 7800 grams, a four-ball hardness index of 85, and an air jet attrition percent loss of 25.

Example 3

Using the identical extruder and die plate arrangement as that used in Example 2 except that the clay and water mixture contained 35.9 water percent weight on a 220° F. dry basis, clay pellets having a bulk density of 0.99 kilogram per liter, a knife edge hardness of 8600 grams, a four-ball hardness index of 80 and an air jet attrition percent loss of 22 were obtained.

Example 4

The effect of having smaller openings in the inner die plate was studied by utilizing a 2" extruder with an inner die plate having a thickness of ½" and being provided with 3 mm. openings, and also utilizing an exit die plate having a thickness of ¾" and being provided with 4.75 mm. openings; the two die plates being separated from each other at a distance of ¾". With this arrangement, and using a clay having 35.2 water percent weight per 220° F. dry basis clay pellets having a bulk density of 0.98 kilogram per liter, a knife edge hardness of 8600 grams, four-ball hardness index of 89 and an air jet attrition percent loss of 16 were obtained.

The hardness index (H.I.) of the catalyst was determined by a standard test designed as an empirical measure of frictional attrition. In this test the catalyst pellets of #3 to #5 screen size are rotated with steel balls in a cylindrical can on its longitudinal axis at constant speed for an hour. The hardness index (H.I.) is then computed by weighing the catalyst retained on a #6 screen, thus:

$$H.I. = \frac{Wt. \#6 \text{ fraction} \times 100}{Wt. \text{ of original } (\#3 \text{ to } \#5) \text{ sample}}$$

Knife-edge hardness is determined by loading a knife edge (of the type used in analytical balances), placed upon the cylindrical surface of the pellet, until the pellet breaks.

Jet attrition is determined by forcing a jet of air through a layer of the catalyst in an inverted Erlenmeyer flask for one hour to cause the pellets to strike the walls and bottom of the flask. The loss in weight of fines formed and removed is recorded as "Jet attrition percent loss."

The method of the present invention may also be practiced in the roll-ring type extruder of the present invention shown in Figures 3 and 4. Referring to these figures, the roll-ring extruder there-shown is designated by the numeral 30. This extruder comprises a drive-plate 32 which is rotated on drive shaft 34.

A pair of rings 36 and 38 are fixedly secured as by bolts or other means to the face of drive-plate 32 and rotate therewith. Each of rings 36 and 38 is perforated, the diameter of the perforation in ring 38 being somewhat larger than the diameter of the finished pellets to allow for shrinkage. Rings 36 and 38 are spaced from each other a distance approximating the distances between the die plates in the worm-type extruder 10 shown in Figures 1 and 2 to form intermediate chamber 37 therebetween. Within the confines of the housing 40 of extruder 30, there is provided a pair of presser idler rollers 42, mounted upon a yoke 44. Idler rollers 42 rotate within housing 40 and press the material fed into housing 40 through the perforations in ring 36. Extruder 30 is provided with a vibratory feeder or feed hopper 46 which introduces the plasticized mixture to within housing 40. Hopper 46 in turn is fed from screw conveyor 48 into which the plasticized water and clay mixture is introduced.

The plasticized water and clay mixture is pressed by presser rollers 42 against the inner surface of inner ring 36 and is pressed thereby through the openings within inner ring 36. The material is then passed into chamber 37 intermediate rings 36 and 38 and then is discharged through the openings in ring 38. In order to minimize any tendency of the plasticized material to excessive sideways peripheral flow and to reduce the tendency of the material to back-feed through the openings in ring 36, it may be desirable to divide chamber 37 into cells or honeycomb compartments or the like by the inclusion of suitable spacing members which permit unimpeded through flow and act to obstruct sideways movement of any great amount.

The present invention may be embodied in other specific forms without departing from the spirit or essential attributes thereof and, accordingly, reference should be made to the appended claims, rather than to the foregoing specification as indicating the scope of the invention.

It is claimed:

1. A method for forming pellets from a plasticized clay mass which comprises the steps of introducing said mass into one end of a confined extrusion zone having at its other end a closely-grouped plurality of stationary small openings; impelling said mass through said extrusion zone, to, and through said openings into a confined, relatively-short reforming zone, said mass being received into said reforming zone as a corresponding plurality of plasticized strands and immediately being reformed into a second plasticized mass of substantially the same transverse thickness as that impelled to said first named openings, continuing forward movement of said strands without appreciable lateral displacement from the path determined by said openings; impelling said reformed mass to and through a second plurality of closely-grouped stationary openings at the forward end of said reforming zone, the total area of the second plurality of openings being not appreciably greater than the total area of the first plurality of openings; and periodically cutting off the plasticized strands of clay discharging from said second plurality of openings to form pellets of the desired length.

2. A method as in claim 1, characterized in that the number of openings in said second plurality exceeds the number of openings in said first plurality.

3. A method as in claim 1, in which said second plurality of openings are of smaller diameter than said first plurality of openings.

4. A method as in claim 3, in which the openings of said second plurality of openings are approximately half the size of the openings in said first plurality.

5. A method as in claim 1, in which the length of said reforming zone is in the range of 2 to 20 times the diameter of the openings in said first plurality of openings.

References Cited in the file of this patent

UNITED STATES PATENTS

| | | |
|---|---|---|
| 1,375,623 | Bartels | Apr. 19, 1921 |
| 2,488,129 | La Lande | Nov. 15, 1949 |
| 2,543,679 | Van Riper | Feb. 27, 1951 |
| 2,624,094 | Smith | Jan. 6, 1953 |
| 2,628,401 | Fiedler | Feb. 17, 1953 |
| 2,693,017 | Czarnecki et al. | Nov. 2, 1954 |
| 2,693,018 | Czarnecki | Nov. 2, 1954 |
| 2,749,590 | Kilpatrick | June 12, 1956 |
| 2,771,636 | McIntosh et al. | Nov. 27, 1956 |